(12) United States Patent
Mathieu et al.

(10) Patent No.: US 6,185,083 B1
(45) Date of Patent: Feb. 6, 2001

(54) PROTECTED TELECOMMUNICATION TEST ADAPTER MODULE

(75) Inventors: Randall E. Mathieu, Pittsburg, PA (US); William R. Olsen, Hillsboro, OR (US)

(73) Assignee: NEC America, Inc., Hillsboro, OR (US)

( * ) Notice: Under 35 U.S.C. 154(b), the term of this patent shall be extended for 0 days.

(21) Appl. No.: 09/209,527

(22) Filed: Dec. 11, 1998

(51) Int. Cl.$^7$ ...................................................... H02H 1/00
(52) U.S. Cl. .............................................. 361/119; 379/27
(58) Field of Search ..................... 361/111, 117, 361/118, 119; 714/717; 324/511, 512, 522, 525, 158.1; 379/1, 9, 14, 21, 26, 27, 29, 32, 377, 382

(56) References Cited

U.S. PATENT DOCUMENTS

| | | | |
|---|---|---|---|
| 4,209,671 | * | 6/1980 | Charles et al. ......................... 379/27 |
| 4,307,430 | | 12/1981 | Montalto et al. ...................... 361/124 |
| 4,564,728 | * | 1/1986 | Romano .................................. 379/27 |
| 5,392,327 | * | 2/1995 | Galpin ...................................... 379/2 |
| 5,392,349 | | 2/1995 | Elder, Jr. ............................... 379/412 |
| 5,539,801 | | 7/1996 | Herh et al. ............................... 379/1 |
| 5,548,641 | | 8/1996 | Butler et al. .......................... 379/399 |
| 5,687,213 | | 11/1997 | Larkin .................................... 379/21 |

OTHER PUBLICATIONS

OSP Troubleshooting Kit, Westek Electronics, Inc. (2 pgs) No Date.

Tester Storage Disc Assembly Schematic, Reliable Electric Company (1 pg) No Date.

Test Cord Assembly Schematic, Reliable Electric Company (1 pg) No Date.

Two–Pair Station Protectors, Reliable Electric Company, Section 1, p. 19 No Date.

Test Equipment Accessoris, Reliable Electric Company, Section 1, p. 73 No Date.

R–700 Connector Overvoltage Protection Modules, Reliable Electric Company, Section 8, p. 31 No Date.

Joslyn Technical Data, Gas Tube, Models 2401–3X, 2402–4X, 2405–OX and Continuity, Model 2403–OX Series (2 pgs) No Date.

* cited by examiner

Primary Examiner—Ronald W. Leja
(74) Attorney, Agent, or Firm—Skjerven Morrill MacPherson LLP; Edward C. Kwok

(57) ABSTRACT

A protected telecommunications test adapter for use in troubleshooting telephone networks. The test adapter plugs into an industry standard panel and provides access to the network wiring via an RJ11 connector or clip posts. The test adapter has a surge protector to protect both user and equipment. The test adapter is of a modular enclosed housing design for portability and low manufacturing cost. Since the test adapter is intended for temporary test installation, its dimension is designed for ease of removal, installation, and access to the test connector or posts.

6 Claims, 4 Drawing Sheets

PHYSICAL LAYOUT
(DIMENSIONS ARE APPROXIMATE)

PROTECTED TELECOMMUNICATION TEST ADAPTER MODULE

FIELD OF THE INVENTION

This invention generally relates to telecommunications test adapters and more particularly to test adapters for use in troubleshooting telephone networks.

BACKGROUND OF THE INVENTION

Telecommunications cables going into a building or structure are usually routed to an interface panel where outside line cables and in-house equipment cables meet. The interface panel is provided so that outside line connection can be broken for testing or service purposes. The schematic diagram of an interface panel arrangement is shown in FIG. 1. Captured socket 9 is part of the interface panel and is provided for mounting protector module 5. Line tip wire 1 and line ring wire 2 are part of a cable going into the building. Equipment ring wire 3 and equipment tip wire 4 are part of a cable which connect to telecommunications equipment. Protector module 5 is used to couple the telecommunications equipment to the outside line. Protector module 5 includes surge protector 6. Surge protector 6 is used to protect users and equipment against high voltage that may be induced by lightning or power crosses. Ground wire 7 connects surge protector 6 to earth ground for shunting any high voltage surge currents.

One of the commercially available protector modules used in telephone central offices and remote structures is the 5 pin type 303. Also popular is the 6 pin type 700 module. The type 700 is similar to the type 303 except that the type 700 has an additional pin to accommodate an alarm signal 8.

In servicing the telecommunication network or equipment, the connection between the outside line wires and equipment wires is broken to allow service personnel to isolate the equipment from the line. Once connection is broken, tests can be made on the equipment without the influence of the outside lines and vice versa. Since protector module 5 provides continuity between the outside line wires and equipment wires, protector module 5 must be removed to break the connection. Removal of protector module 5 is also necessary because protector modules have enclosed housings which prevent access to the wiring for safety reasons. Although some protector modules have a housing that can be opened or have openings in the housing to allow test probes to contact the line and equipment wires, the wiring connection, usually a terminal strip, does not allow for hooking-up or clipping-in test instruments thereby forcing service personnel to physically hold the probes to the wires during test.

Test assembly 13, a prior art test adapter, is shown in FIG. 2. Protector module 5 is removed from the interface panel and is replaced by station protector block 10. Station protector block 10 provides access to the outside line wires and equipment wires. Station protector block 10 has an eight to twelve foot long four conductor cord 11 which is usually wound on a reel or disc. The other end of conductor cord 11 is fitted with socket 12 for connecting protector module 5. Note that protector module 5 is required in test assembly 13 to provide surge protection. Test assembly 13 can be built using, for example, Reliance Comm/Tec part numbers F013590 (patch cord) and R128 (protector block) along with a protector block.

There are other prior art test adapters that are more modular than test assembly 13. However, these adapters only provide a mechanical interface to the telephone wiring and does not incorporate requisite safety elements such as surge protectors.

Thus there is clear need for a protected, modular, and easy to use test adapter for servicing telephone networks.

SUMMARY OF THE INVENTION

The problems with the prior art are overcome by the test adapter of the present invention. The present invention is a telecommunications test adapter that is modular, protected from current surges, and provides an interface between a telecommunications industry standard 5 or 6 pin module protector socket and an RJ11 telephone jack or test posts.

BRIEF DESCRIPTION OF THE DRAWINGS

FIG. 3 shows the physical layout of an embodiment of the present invention. FIG. 3(d) shows a type 303 connector while FIG. 3(e) shows a type 700.

DETAILED DESCRIPTION OF THE INVENTION

Figure 1:
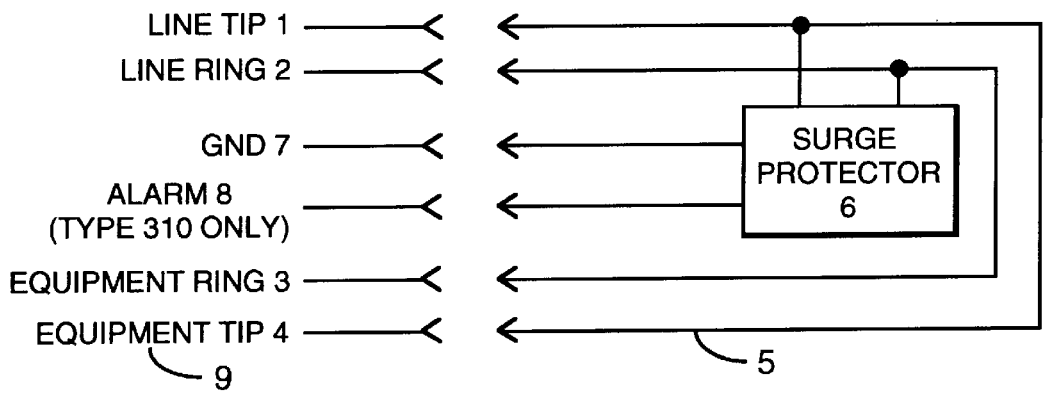
FIG. 1 is a schematic diagram of an interface panel in a building or structure where connections between outside lines and equipment are made.
Figure 2:
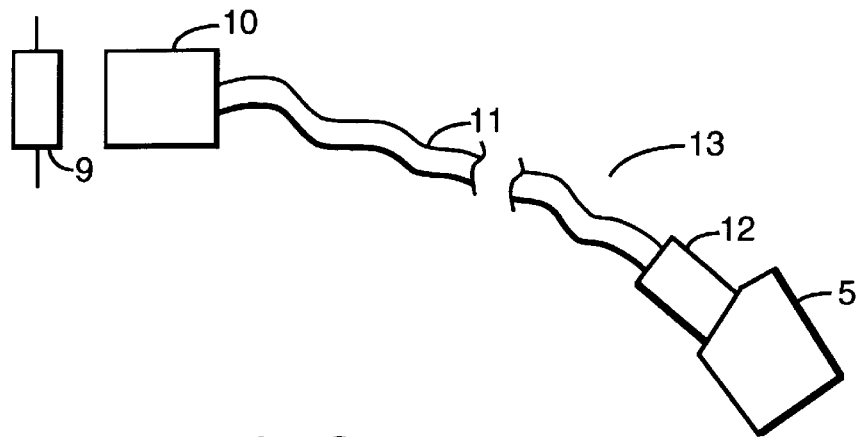
FIG. 2 shows a prior art test adapter.
Figure 3A:
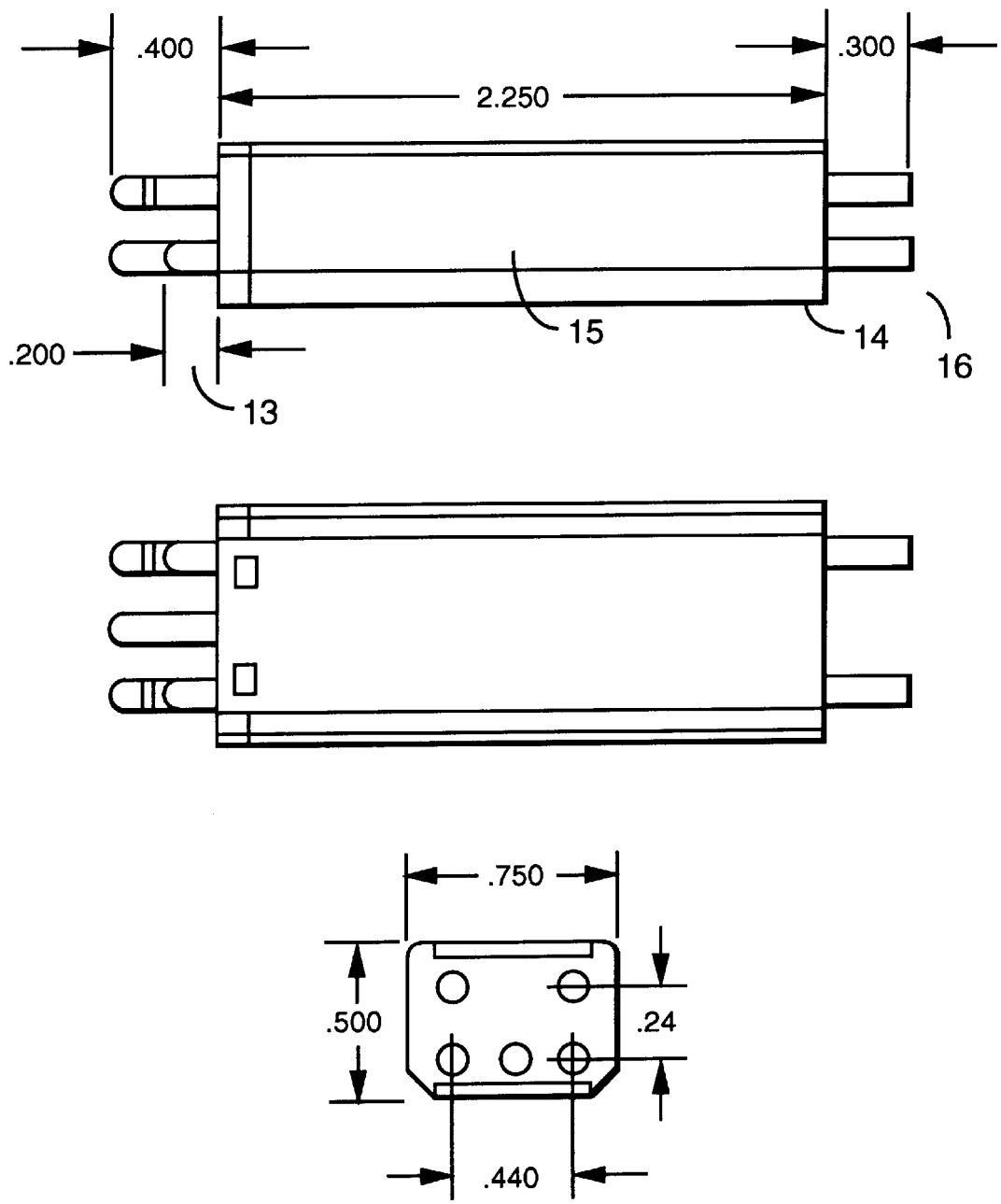
FIG. 3(a) is a pictorial diagram.
Figure 3B:
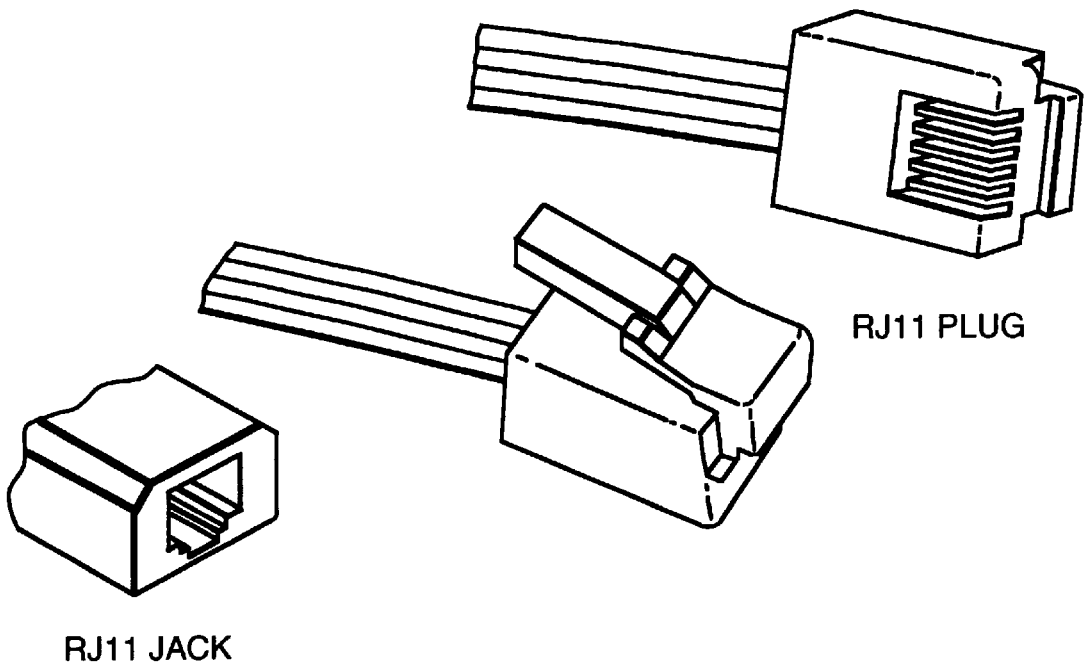
FIG. 3(b) is an RJ11 plug or receptacle that can be used on the test end of the invention.
Figure 3C:
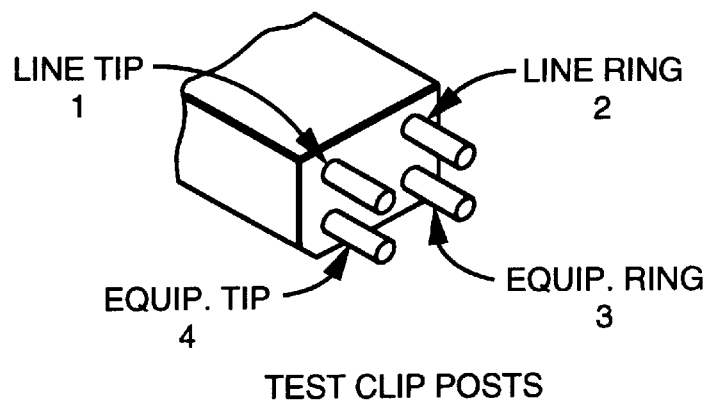
FIG. 3(c) shows test clip posts which can also be used on the test end.

An embodiment of the present invention, test adapter 16, is shown in FIG. 3(a). Test adapter 16 has a panel end 13 for connecting to captured socket 9 of the interface panel and a test end 14 for connecting to test instruments. Test end 14 could be an RJ11 plug or receptacle as in FIG. 3(b). For use with alligator clips, test end 14 can also be a plurality of test clip posts as shown in FIG. 3(c).

Figure 3D:
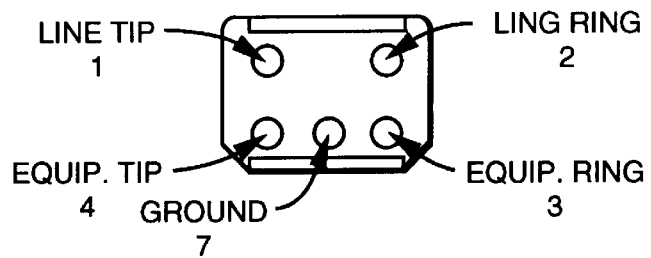
FIGS. 3(d) and 3(e) are possible configurations on the panel end of the embodiment.
Figure 3E:
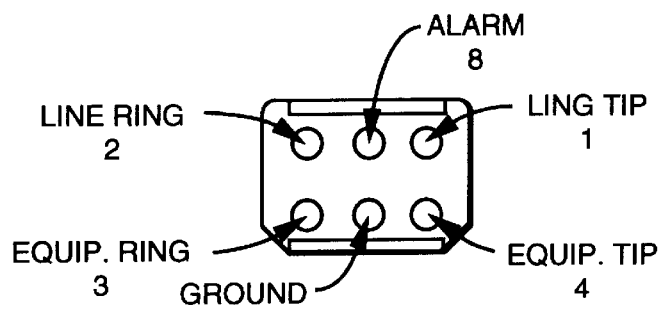

Panel end 13 can be configured for a type 303 (FIG. 3(d)) or a type 700 (FIG. 3(e)) connector.

Figure 4:
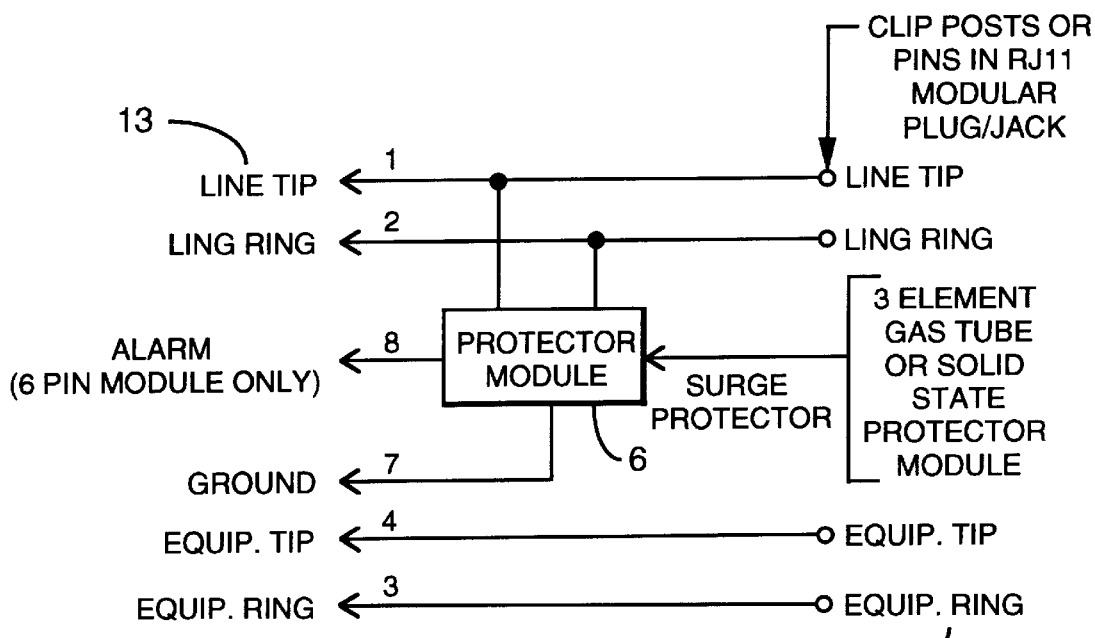
FIG. 4 is the schematic diagram of an embodiment of the present invention.

The schematic diagram of test adapter 16 is shown in FIG. 4. When plugged into captured socket 9 of the interface panel, line tip 1 and line tip 2 is disconnected from equipment tip 4 and equipment ring 3. This arrangement isolates the telecommunications equipment from the outside line for service purposes as described above. When a type 700 is used in panel end 13, alarm pin 8 is not used nor electrically connected but is provided for mechanical compatibility only.

High voltage surge protection on the line side is provided by surge protector 6. Surge protector 6 is connected to earth ground via ground 7 for shunting surge currents to ground. Surge protector 6 is widely known in the art and could be a gas tube or solid state arrestor. The breakdown voltage of surge protector 6 is selected to meet various field applications. Surge protector 6 is connected to line tip 1 and line ring 2 to provide protection on the line side during testing.

As shown in FIG. 3(a), all components of test adapter 16 are enclosed within housing 15. Housing 15 is preferably made of plastic material. Test adapter 16 is not intended for permanent installation. Accordingly, test adapter 16 is slightly longer than protector module so that the adapter is easily grasped for removal and installation and to allow convenient access to test end 14.

A protected telecommunications test adapter module has been described above. The present invention offers significant improvements over the prior art in terms of its size, manufacturing cost, safety, and ease of use. While an embodiment of this invention have been described, other embodiments of this invention will be obvious to those skilled in the art in view of this disclosure.

What is claimed is:

1. A protected telecommunications test adapter wherein telephone lines are isolated from telephone equipment comprising:
   a housing having a first end and a second end;
   a first connector on the first end of said housing, said first connector being coupled to a connector of a telecommunications interface panel;
   a second connector on the second end of said housing, said second connector being coupled to said first connector; and
   a surge protector coupled to said first connector and said second connector.

2. The telecommunications test adapter of claim 1 wherein said first connector is a type 303 connector and wherein said second connector is an RJ11 type.

3. The telecommunications test adapter of claim 1 wherein said first connector is a type 303 connector and wherein said second connector is a plurality of posts.

4. The telecommunications test adapter of claim 1 wherein said first connector is a type 700 connector and wherein said second connector is an RJ11 type.

5. The telecommunications test adapter of claim 1 wherein said first connector is a type 700 connector and wherein said second connector is a plurality of posts.

6. A protected telecommunications test adapter wherein telephone lines are isolated from telephone equipment comprising:
   a housing means having a first end and a second end;
   a first connector means on said first end of said housing means;
   a second connector means on said second end of said housing means, said first connector means being coupled to said second connector means;
   surge protection means coupled to said first connector means and said second connector means.

* * * * *